United States Patent
Perira et al.

(10) Patent No.: US 7,925,760 B2
(45) Date of Patent: Apr. 12, 2011

(54) ACHIEVING AT LEAST SUBSTANTIALLY CONSTANT PROCESSING REQUEST THROUGHPUT WITHIN ENVIRONMENT HAVING VARYING RESOURCE AVAILABILITY

(75) Inventors: Alexander Nathenial Perira, Bangalore (IN); Ajay Sood, Bangalore (IN); Vijay Sukthankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 12/406,931

(22) Filed: Mar. 18, 2009

(65) Prior Publication Data

US 2010/0241743 A1    Sep. 23, 2010

(51) Int. Cl.
G06F 15/173    (2006.01)
(52) U.S. Cl. .......................... 709/226; 709/224
(58) Field of Classification Search .................. 709/226, 709/224
See application file for complete search history.

(56) References Cited

U.S. PATENT DOCUMENTS

| | | | |
|---|---|---|---|
| 6,571,288 B1 | 5/2003 | Sarukkai | |
| 6,681,251 B1 | 1/2004 | Leymann et al. | |
| 6,922,724 B1 | 7/2005 | Freeman et al. | |
| 7,548,977 B2 * | 6/2009 | Agapi et al. | 709/226 |
| 7,584,262 B1 * | 9/2009 | Wang et al. | 709/217 |
| 7,647,401 B1 * | 1/2010 | Collet et al. | 709/224 |
| 2003/0126200 A1 * | 7/2003 | Wolff | 709/203 |
| 2005/0021530 A1 * | 1/2005 | Garg et al. | 707/100 |
| 2006/0069780 A1 * | 3/2006 | Batni et al. | 709/226 |
| 2006/0190602 A1 * | 8/2006 | Canali et al. | 709/226 |
| 2007/0124476 A1 * | 5/2007 | Oesterreicher et al. | 709/226 |
| 2007/0245165 A1 | 10/2007 | Fung | |
| 2007/0250631 A1 * | 10/2007 | Bali et al. | 709/226 |

FOREIGN PATENT DOCUMENTS

WO    2007067652 A2    6/2007

OTHER PUBLICATIONS

R. Raghavendra et al., "No 'power' struggles: coordinated multi-level power management for the data center," Proceedings of ASPLOS'08, Mar. 1-5, 2008, Seattle, Wash., USA.
J. Xu et al., "On the use of fuzzy modeling in virtualized data center management," 4th Int'l Conf. on Autonomic Computing (ICAC'07), IEEE 2007.

(Continued)

*Primary Examiner* — Krisna Lim
(74) *Attorney, Agent, or Firm* — Andre Gibbs

(57) ABSTRACT

Resource loads are determined based on normalized factors that are themselves based on resource factors. The following is repeated until each resource's load is less than or equal to the resource's willingness capacity or until all the resources are each fully loaded or unavailable. Each resource's willingness capacity is determined based on the resource's willingness parameter. The willingness parameter indicates at least whether a resource is willing to receive a number of processing requests no greater than a maximum or a minimum request limit. A throughput overflow is determined for each resource having a load greater than its willingness capacity. The load for each resource having a throughput overflow greater than zero is reset. The load for each resource that is available and not fully loaded is updated based on new normalized factors and based on a potential throughput loss that is equal to a sum of the throughput overflows.

20 Claims, 3 Drawing Sheets

OTHER PUBLICATIONS

R.A. Parameswaran et al., "Virtualization in system p," Internet web site www.ibm.com/developerworks/aix/library/au-syspvirutalization, Nov. 13, 2007.

G. Qu et al., "Energy minimization with guaranteed quality of service," Proceedings of ISLPED'00, Rapallo, Italy, 2000.

N. Banerjee et al., "Triage: balancing energy and quality of service in a microserver," Proceedings of MobiSys'07, Jun. 11-13, 2007, San Juan, Puerto Rico, USA.

G. Chen et al., "Energy-aware server provisioning and load dispatching for connection-intensive Internet services," Proceedings of NSDI'08, USENIX 2008.

R. Guerra et al., "Attaining soft real-time constraint and energy-efficiency in web servers," Proceedings of SAC'08, Mar. 16-20, 2008, Fortaleza, Ceara, Brazil.

* cited by examiner

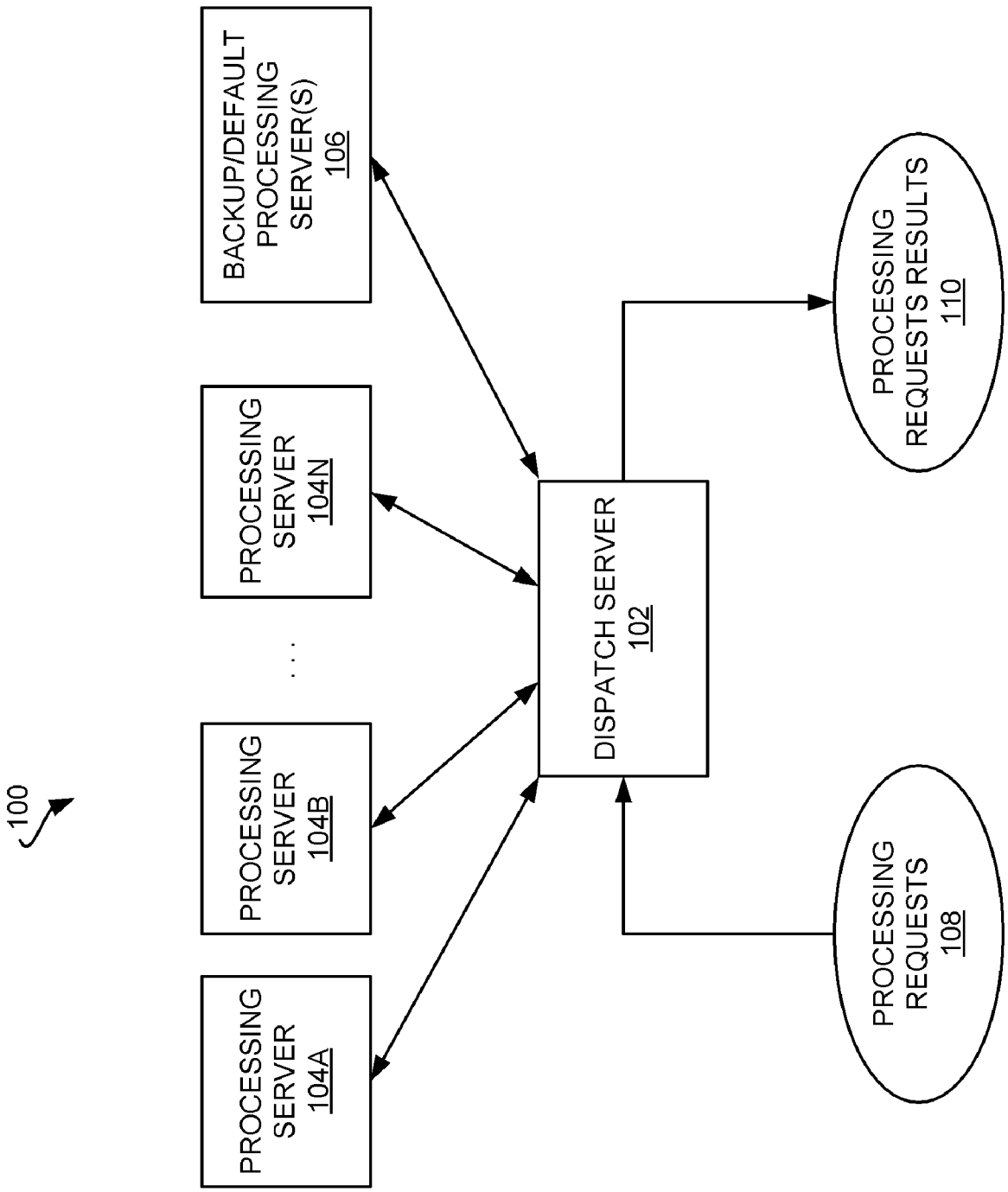

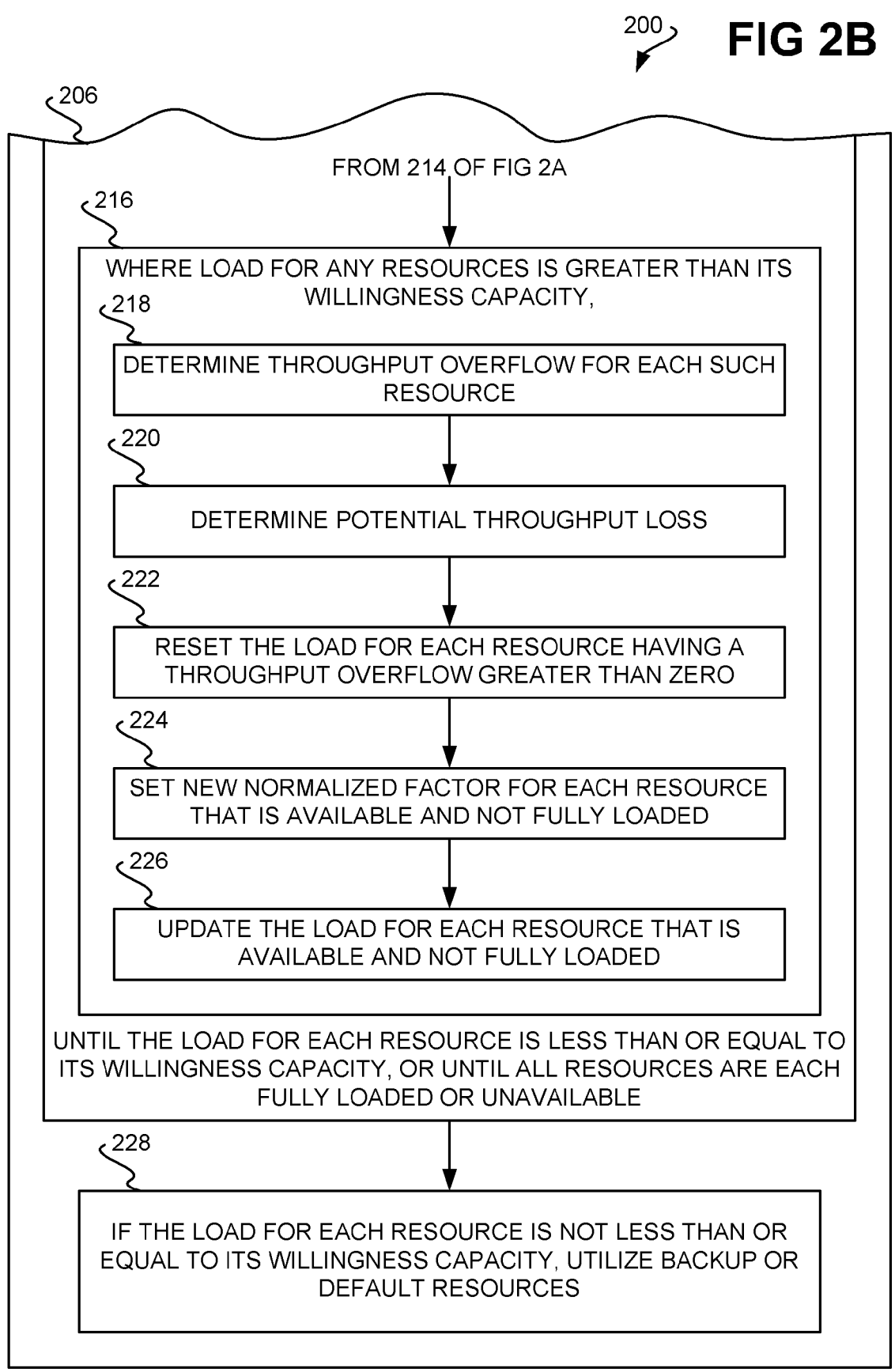

ACHIEVING AT LEAST SUBSTANTIALLY CONSTANT PROCESSING REQUEST THROUGHPUT WITHIN ENVIRONMENT HAVING VARYING RESOURCE AVAILABILITY

FIELD OF THE INVENTION

One embodiment of the present invention relates generally to an environment in which a number of resources process requests. This embodiment relates more particularly to achieving at least substantially constant processing request throughput within such an environment having varying resource availability. This embodiment relates even more particularly to achieving such at least substantially constant processing request throughput while taking into account power conservation requirements.

BACKGROUND OF THE INVENTION

To handle processing requests, such as database queries, Internet web site requests, and so on, a collection of server computing devices, or servers, may be set up to ensure that a desired processing request throughput is achieved. When a new request is received, the request is dispatched to one of the server computing devices to process the request. Assuming all the servers remain available, the desired processing request throughput can be maintained. However, occasionally one or more of the servers may become unavailable, due to a hardware or software malfunction, the servers in question requiring maintenance, and so on. In such situations, it can be difficult to maintain the desired processing request throughput.

SUMMARY OF THE INVENTION

One embodiment of the present invention achieves at least substantially constant processing request throughput without an environment having varying resource availability, such as varying server availability. Some embodiments of the invention achieve such at least substantially constant processing request throughput while also taking into account power conservation requirements.

A method according to a general embodiment of the invention sets a normalized factor for each of a number of resources based on the factors of the resources, and determines a load for each resource based on these normalized factors. The method repeats the following until the load for each resource is less than or equal to the willingness capacity of the resource, or until all the resources are each fully loaded or unavailable. First, the method determines the willingness capacity for each resource based on the willingness parameter of the resource. Second, the method determines a throughput overflow for each resource having a load greater than a willingness capacity, determines a potential throughput loss as equal to the sum of these throughput overflows, and resets the load for each resource having a throughput overflow greater than zero. Third, the method sets a new normalized factor for each resource that is available and not fully loaded, and updates the load for each such resource based on the new normalized factors.

Embodiments of the invention provide for certain advantages. The inclusion of a willingness parameter permits at least substantially constant processing request throughput to be achieved within an environment having varying resource availability, in particular when one or more of the resources become unavailable. The willingness parameter specifies at least whether a given resource is willing to receive a number of processing requests no greater than its maximum request limit or no greater than its minimum request limit. Assuming that one or more resources have willingness parameters indicating that they are willing receiving processing requests no greater than their maximum request limit, the environment is provided with a certain degree of flexibility in distributing processing requests over the resources. As such, at least substantially constant processing request throughput can be achieved even when one or more resources become unavailable.

Furthermore, in some embodiments, the willingness parameter further indicates whether or not a given resource is willing to participate in power conservation. As such, the resources that are unwilling to participate in power conservation are effectively favored when determining which resources should have their processing request loads increased past their minimum request limit and towards their maximum request limit. That is, resources that are willing to participate in power conservation are purposefully to at least some degree held to loads no greater than their minimum request limits. Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram of an environment or system for handling processing requests and including a number of server computing devices or other types of resources, according to an embodiment of the invention.

FIGS. 2A and 2B are flowcharts of a method to achieve at least substantially constant processing request throughput within the environment of FIG. 1, according to an embodiment of the invention.

DETAILED DESCRIPTION OF THE DRAWINGS

Figure 2A:
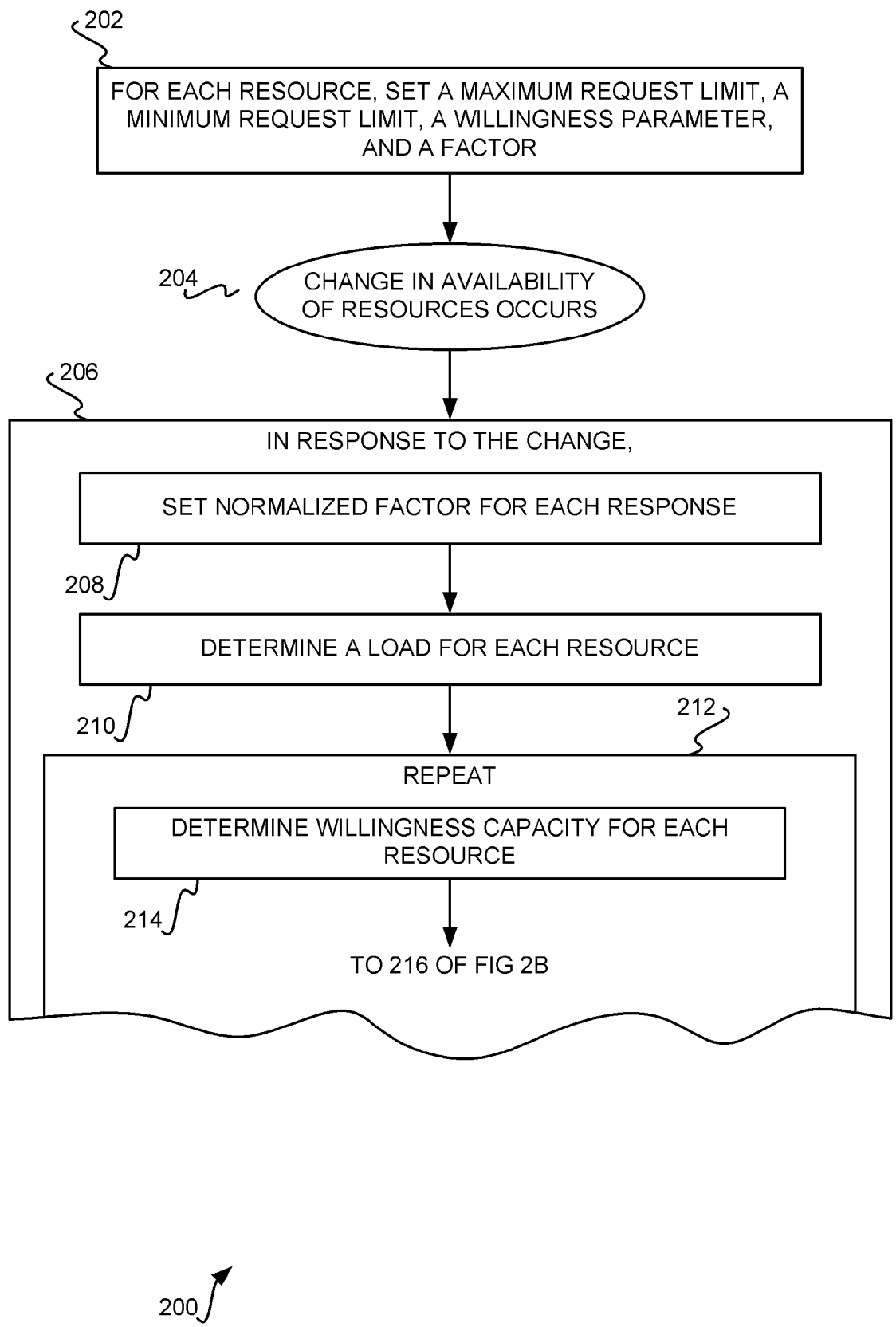

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The detailed description section is divided into sub-sections as follows. The first sub-section presents a representative processing request environment having a number of resources, in relation to which embodiments of the present invention can be implemented. The second sub-section presents a detailed method as to how at least substantially constant processing request throughput can be achieved within such an environment. The third sub-section provides various examples that help explain this detailed method. Finally, the fourth sub-section presents embodiments of the invention in which power conservation is also taken into account while achieving at least substantially constant processing request throughput within an environment of resources.

Representative Processing Request Environment

FIG. 1 shows a representative environment, or system, 100, according to an embodiment of the invention. The environment 100 can include a dispatch server 102, and a number of processing servers 104A, 104B, . . . , 104N, collectively referred to as the processing servers 104. The environment 100 can further include one or more backup or default processing servers 106. Those of ordinary skill within the art can appreciate that other types of environments are amenable to embodiments of the invention as well. For example, the dispatch server 102 may not be present, and/or the backup or default processing servers 106 may not be present.

The servers 102, 104, and 106 are each a server computing device. Such a server computing device can include hardware and software. Hardware of a server computing device commonly includes one or more processors, volatile memory, and storage devices like hard disk drives, among other types of hardware. The dispatch server 102 is communicatively connected to the servers 104 and 106, such as over a network. As such, the servers 102, 104, and 106 typically include network communication hardware, like network adapters, and so on.

The processing servers 104 and 106 are more generally referred to as resources. Other types of resources include storage devices, and so on. The processor servers 104 and 106 process processing requests received from the dispatch server 102. In response, the processor servers 104 and 106 may generate processing request results that are sent back to the dispatch server 102. The processing servers 104 in particular may be available or unavailable. An available processing server is currently online and can receive processing requests to process, whereas an unavailable processing server is currently offline and cannot receive processing requests to process.

The dispatch server 102 receives processing requests 108 in one embodiment. The processing requests 108 may be database queries, Internet web site requests, or other types of processing requests, and may be generated by client computing devices or other types of computing devices. The dispatch server 102 dispatches, or sends, each processing request to one of the processing servers 104 to process the request. If the processing servers 104 are each currently fully loaded or unavailable, then the dispatch server 102 may alternatively send a given processing request to one of the backup or default processing servers 106.

In another embodiment, in which the dispatch server 102 is not present, for instance, the processing requests 108 may be directly received by the processing servers 104 and 106 from the client computing devices that generated the requests 108. In such an embodiment, there may be a predetermined approach by which the processing servers 104 and 106 decide among themselves which processing server is to handle a newly received processing request. For example, a round-robin approach may be employed, or another approach may be employed, as can be appreciated by those of ordinary skill within the art.

When one of the processing servers 104 and 106 has finished processing a given processing request that has been dispatch to this server, the server in question can generate a processing request result that may be sent back to the dispatch server 102 in one embodiment. As such, the dispatch server 102 returns processing request results 110, corresponding to the processing requests 108, back to the computing devices that generated the processing requests 108. In another embodiment, the processing servers 104 and 106 may themselves return the processing request results 110 back to the computing devices that generated the processing requests 108, without sending the results 110 back to the dispatch server 102.

Method to Achieve at Least Substantially Constant Processing Request Throughput

FIGS. 2A and 2B show a method 200 to achieve at least substantially constant processing request throughput within a resource environment such as the environment 100 of FIG. 1, according to an embodiment of the invention. The method 200, as well as other methods of embodiments of the invention, can be implemented via one or more computer programs stored on a computer-readable medium like a recordable data storage medium. The execution of the computer programs by one or more processors result in performance of the method in question.

For each resource, a maximum request limit, a minimum request limit, a willingness parameter, and a factor are set (202). It is noted that the resources to which all the parts of the method 200 pertain, except for the final part 228, are, for example, the processing servers 104 of FIG. 1, and not, for example, the backup or default processing servers 106 of FIG. 1. The maximum request limit of a given resource indicates the number of processing requests, such as per unit of time like seconds, that the given resource is to maximally receive. By comparison, the minimum request limit indicates the number of processing requests, such as per unit of time like seconds, that the given resource prefers to maximally receive.

For example, a resource may have a minimum request limit of 25 processing requests per second, and a maximum request limit of 125 processing requests per second. The resource may optimally (i.e., most efficiently from a performance and/or power perspective) process processing requests where it does not receive more than the minimum request limit. As such, the resource prefers to process no greater than the minimum request limit of processing requests. However, the resource may nevertheless be able to process processing requests no greater than the maximum request limit without becoming overloaded such that it drops or does not adequately process the requests. However, at the maximum request limit, the resource may not perform optimal processing. For example, at the maximum request limit, the resource may consume greater amounts of power, and/or the resource may process requests more slowly.

The willingness parameter of a given resource indicates at least whether the resource is willing to receive a number of processing requests no greater than its minimum request limit or is willing to receive a number of processing requests no greater than its maximum request limit. For example, if the willingness parameter is set to zero, then the resource in question may just be willing to receive a number of processing requests no greater than its minimum request limit. By comparison, if the willingness parameter is set to one, then this resource is willing to receive a number of processing requests no greater than its maximum request limit.

If the willingness parameter of a given resource specifies that the resource is willing to receive up to its minimum request limit, then the resource cannot be provided with processing requests more than its minimum request limit. By comparison, if the willingness parameter specifies that the resource in question is willing to receive up to its maximum request limit, then the resource can be provided processing requests up to its maximum request limit. The willingness parameter is an innovative feature devised by the inventors, which permits at least substantially constant processing throughput to be achieved within the environment, even when one or more resources become unavailable, as will become apparent later in the detailed description.

The factor of a given resource relatively indicates the extent to which the given resource is willing to receive processing requests within the environment (i.e., to be processed within the environment). The factor of a given resource may be specified as a number between zero and one. A factor of zero indicates that a given resource is unwilling to receive any processing requests within the environment, whereas a factor of one indicates that the resource is willing to receive all the processing requests within the environment that it can. As such, the higher the factor, the more processing requests that a given resource can receive within the environment.

The factors for the resources may be set based on the varying responsibilities that the resources have. For example, a resource completely dedicated to processing requests within the environment in question may have a factor of 0.9 or even 1.0. By comparison, a resource that also has to perform other functionality, in addition to processing requests within the environment, may have a relatively factor, such as 0.1.

A change in the availability of the resources ultimately occurs within the environment (204). Such a change can include the resources initially going online, where all the resources are available. Thereafter, such a change can include one or more of the resources becoming unavailable, such as by going offline due to a malfunction or another cause, and can also include one or more of the resources becoming available again, such as by going back online due to a repair, for instance.

In response to the change, the method 200 performs the following (206). First, a normalized factor is set for each resource (208). Where there is at least one resource that is available, the normalized factor for a given resource that is available is equal to the given resource's factor, divided by the sum of the factors of all the resources that are available. Where there is at least one resource that is available, the normalized factor for a given resource that is unavailable is set to zero. Furthermore, where no resources are available, the normalized factor for each resource is set equal to zero. As such, it can be said that the normalized factor for each resource is set based on the factors of the resources.

The processing request load to be handled by each resource is then determined (210). The load to be handled by a given resource is the number of processing requests, such as per time unit like seconds. The load for a given resource is set equal to the total number of processing requests to be handled within the environment of the resources, multiplied by the normalized factor for the given resource. As such, the loads for resources that are unavailable are zero, because the normalized factors for such unavailable resources are zero. It can be said that the load for each resource is determined based on the normalized factors.

The method 200 then repeats the following until the load for each resource is less than or equal to its willingness capacity, or until all the resources are each fully loaded or unavailable (212). First, the willingness capacity for each resource is determined (214). In general, the willingness capacity of a resource is the maximum number of processing requests that the resource is willing to handle. As such, the willingness capacity for a given resource is equal to its maximum request limit or its minimum request limit, in accordance with (i.e., as dictated by) the willingness parameter of this resource.

For example, where the willingness parameter of a given resource indicates that the given resource is willing to receive a number of processing requests no greater than its maximum request limit, then this resource's willingness capacity is set to its maximum request limit. Likewise, where the willingness parameter of a given resource indicates that the given resource is willing to receive a number of processing requests no greater than its minimum request limit, then this resource's willingness capacity is set to its minimum request limit. In one embodiment, the willingness capacity is set in this manner just for resources that are available, where, for instance, the willingness capacity is set to zero for resources that are unavailable, since these latter resources are not capable of handling any processing requests while unavailable.

If the load for any resource determined in part 210 is greater than its willingness capacity (216), then the method 200 performs the following. First, the throughput overflow for each such resource is determined (218). The throughput overflow for a given resource having a load greater than its willingness capacity is equal to the load minus the willingness capacity. The throughput overflow for a resource that does not have a load greater than its willingness capacity is by comparison equal to zero. The potential throughput loss is then determined (220), which is equal to the sum of the throughput overflows of all the resources that have loads greater than their willingness capacities. The potential throughput loss is the potential loss in processing request handling capability within the environment, due to the fact that at least one of the resources has been assigned a load greater than its willingness capacity.

To erase this potential throughput loss—i.e., to reassign the throughput overflow of each resource having a non-zero throughput overflow—the load for each resource having a throughput overflow greater than zero is first reset (222). Specifically, the load for each resource having a throughput overflow greater than zero is reset to its willingness capacity. As such, after performance of part 222, there are no resources that will have loads greater than their willingness capacities, because the loads of such resources will have been reset to their willingness capacities.

However, the potential throughput loss still has to be reassigned to other resources that were determined to not have loads greater than or equal to their willingness capacities. Therefore, a new normalized factor is set for each resource that is available and that is not fully loaded (224). A resource is not fully loaded if its load is less than its willingness capacity. The new normalized factor for a given resource that is available and that is not fully loaded is set equal to the factor of this given resource, divided by the sum of the factors of all the resources that are available and that are not fully loaded. As such, it can be said that the new normalized factor for each resource that is available and that is not fully loaded is set based on the factors of the resources that are available and that are not fully loaded.

The load for each resource that is available and not fully loaded is then updated (226). In particular, the load for a given resource that is available and not fully loaded is updated by adding to its load (as previously determined in part 210) the potential throughput loss times the new normalized factor for the given resource. For example, if in part 210 the load for a given resource that is available has been determined as L, if this resource is not fully loaded, then the load for the resource after performing part 210 is L+delta-L, where delta-L represents a portion of the potential throughput loss that has been assigned to this resource. In general, it can be said that the load for each resource that is available and not fully loaded is updated based on the new normalized factors that have been determined.

It is noted that updating the loads for the resources that are available and not fully loaded in part 226 can in itself result in one or more of these resources now having loads that exceed their willingness capacities. This is why the method 200, in part 212, repeats parts 214, 216, 218, 220, 222, 224, and/or 226 until the load for each resource is less than or equal to its willingness capacity, or until all the resources are each fully loaded or unavailable. A fully loaded resource is a resource having a load equal to its willingness capacity. Desirably, the method 200 finishes part 212 such that the load for each resource is less than or equal to its willingness capacity, which means that there is no potential throughput loss, because there is no non-zero throughput overflow for any resource.

However, in some situations, there may not be sufficient willingness capacity among the resources that are available and not fully loaded to reassign a potential throughput loss over these resources. As such, in these instances the method 200 finishes part 212 because all the resources are each fully loaded or unavailable, but where a non-zero potential throughput loss remains. Therefore, in one embodiment, if part 212 ends with the load for each resource not being less than or equal to its willingness capacity (228)—which corresponds to a non-zero potential throughput loss remaining—then backup or default resources are utilized. For example, the potential throughput loss may be sent to the backup or default processing servers 106 in FIG. 1.

In another embodiment, however, if part 212 ends with the load for each resource not being less than or equal to its willingness capacity, then one or more of the resources that are not operating at their maximum resource limits may be requested to change their willingness factors to signal that they are now willing to operate at their maximum resource limits. For example, the dispatch server 102 of FIG. 1 may request those of the processing servers 104 that are not operating at their maximum resource limits to change their willingness factors to signal that they are now willing to operate at their maximum resource limits. If one or more such resources so change their willingness factors, then the method 200 may again be performed starting at part 212 (which is not reflected in the flowcharts of FIGS. 2A and 2B).

EXAMPLES

To further explain the method 200 of FIGS. 2A and 2B, examples are now provided. These examples are presented in consideration of the situation where there are initially five resources R1, R2, R3, R4, and R5. These resources can correspond to the processing servers 104 of FIG. 1, for instance (and not, for example, to the backup or default processing servers 106 of FIG. 1). It is presumed that the resources have maximum request limits, minimum resource limits, factors, willingness factors, and therefore willingness capacities as follows.

|  | R1 | R2 | R3 | R4 | R5 |
| --- | --- | --- | --- | --- | --- |
| Maximum request limit | 125 | 50 | 180 | 160 | 150 |
| Minimum request limit | 25 | 25 | 25 | 25 | 25 |
| Factor | 0.1 | 0.2 | 0.3 | 0.4 | 0.5 |
| Willingness factor | 1 | 1 | 0 | 1 | 1 |
| Willingness capacity | 125 | 50 | 25 | 160 | 150 |

Thus, the willingness capacities of resources R1, R2, R4, and R5 are equal to their maximum request limits because their willingness factors are each one. By comparison, the willingness capacity of resource R3 is equal to its minimum request limit because its willingness factor is zero.

In the first example, it is presumed that all five resources are available, and that there are 125 total processing requests to be handled within the environment of these resources. Therefore, the normalized factors, loads, and throughput overflows for the resources are as follows, per parts 208, 210, and 218 of the method 200.

|  | R1 | R2 | R3 | R4 | R5 |
| --- | --- | --- | --- | --- | --- |
| Normalized factor | 0.067 | 0.133 | 0.2 | 0.267 | 0.333 |
| Load | 8 | 17 | 25 | 33 | 42 |
| Throughput overflow | 0 | 0 | 0 | 0 | 0 |

Because the throughput overflow of each resource is zero, this means that there is no potential throughput loss to assign among the resources.

In the second example, however, it is presumed that resource R5 goes down, but that there are still 125 total processing requests to be handled within the environment of these resources. Therefore, the normalized factors, loads, and throughput overflows for the resources are as follows, per parts 208, 210, and 218 of the method 200.

|  | R1 | R2 | R3 | R4 | R5 |
| --- | --- | --- | --- | --- | --- |
| Normalized factor | 0.1 | 0.2 | 0.3 | 0.4 | 0 |
| Load | 12 | 25 | 38 | 50 | 0 |
| Throughput overflow | 0 | 0 | 13 | 0 | 0 |

As a result of the resource R5 going down, the resource R3 now has a throughput overflow of 13.

Therefore, this throughput overflow has to be reassigned among the remaining available and not fully loaded resources R1, R2, and R4. Therefore, the new normalized factors, uploaded loads, and throughput overflows for the resources are as follows, per parts 222, 224, and 226 of the method 200.

|  | R1 | R2 | R3 | R4 | R5 |
| --- | --- | --- | --- | --- | --- |
| New normalized factor | 0.143 | 0.286 | 0 | .571 | 0 |
| Updated load | 12 + 2 | 25 + 4 | 38 − 13 | 50 + 7 | 0 |
| Throughput overflow | 0 | 0 | 0 | 0 | 0 |

Thus, the potential throughput loss of 13, resulting from the throughput overflow of the resource R3, is distributed among the resources R1, R2, and R4. The resources R1, R2, and R4 particularly receive 2, 4, and 7, respectively, of the potential throughput loss, for new updated loads of 14, 29, and 57, respectively. The resource R3 has its load reset to its willingness capacity of 25—that is, the overflow is subtracted from its previously determined load, to result in 38-25=13.

In the third example, it is further assumed that the resource R3 becomes unavailable, in addition to the resource R5 being unavailable. Therefore, the normalized factors, loads, and throughput overflows for the resources are as follows, per parts 208, 210, and 218 of the method 200.

|  | R1 | R2 | R3 | R4 | R5 |
|---|---|---|---|---|---|
| Normalized factor | 0.143 | 0.286 | 0 | .571 | 0 |
| Load | 18 | 36 | 0 | 71 | 0 |
| Throughput overflow | 0 | 0 | 0 | 0 | 0 |

Because the throughput overflow of each resource is zero, this means that there is no potential throughput loss to assign among the resources.

In the fourth example, however, it is further assumed that the resource R4 becomes unavailable, in addition to the resources R3 and R5 being unavailable. Therefore, the normalized factors, loads, and throughput overflows for the resources are as follows, per parts 208, 210, and 218 of the method 200.

|  | R1 | R2 | R3 | R4 | R5 |
|---|---|---|---|---|---|
| Normalized factor | 0.333 | 0.667 | 0 | 0 | 0 |
| Load | 42 | 83 | 0 | 0 | 0 |
| Throughput overflow | 0 | 33 | 0 | 0 | 0 |

As a result of the resource R4 also going down, the resource R2 now has a throughput overflow of 13.

Therefore, this throughput overflow has to be reassigned to the remaining available and not fully loaded resources R1. Therefore, the new normalized factors, uploaded loads, and throughput overflows for the resources are as follows, per parts 222, 224, and 226 of the method 200.

|  | R1 | R2 | R3 | R4 | R5 |
|---|---|---|---|---|---|
| New normalized factor | 1 | 0 | 0 | 0 | 0 |
| Updated load | 42 + 33 | 83 − 33 | 0 | 0 | 0 |
| Throughput overflow | 0 | 0 | 0 | 0 | 0 |

Thus, the potential throughput loss of 33, resulting from the throughput overflow of the resource R2, is distributed to the resource R1, for a new uploaded load of 75. The resource R2 has its load reset to its willingness capacity of 50.

In the fifth example, it is assumed that the resource R1 goes down, but that the resources R3 and R5 are now available again, while the resource R4 remains unavailable. Therefore, the normalized factors, loads, and throughput overflows for the resources are as follows, per parts 208, 210, and 218 of the method 200.

|  | R1 | R2 | R3 | R4 | R5 |
|---|---|---|---|---|---|
| Normalized factor | 0 | 0.2 | 0.3 | 0 | 0.5 |
| Load | 0 | 25 | 38 | 0 | 62 |
| Throughput overflow | 0 | 0 | 13 | 0 | 0 |

In this situation, with resources R1 and R4 down (i.e., unavailable) and resources R2, R3, and R5 up (i.e., available), the resource R3 has a throughput overflow of 13.

Therefore, this throughput overflow has to be reassigned among the remaining available and not fully loaded resources R2 and R5. Therefore, the new normalized factors, uploaded loads, and throughput overflows for the resources are as follows, per parts 222, 224, and 226 of the method 200.

|  | R1 | R2 | R3 | R4 | R5 |
|---|---|---|---|---|---|
| New normalized factor | 0 | 0.286 | 0 | 0 | 0.714 |
| Updated load | 0 | 25 + 4 | 38 − 13 | 0 | 62 + 9 |
| Throughput overflow | 0 | 0 | 0 | 0 | 0 |

Thus, the potential throughput loss of 13, resulting from the throughput overflow of the resource R3, is distributed between the resources R2 and R5. The resources R2 and R5 particularly receive 4 and 9, respectively, of the potential throughput loss, for new updated loads of 29 and 71, respectively. The resource R3 has its load reset to its willingness capacity of 25—that is, the overflow is subtracted from its previously determined load, to result in 38-25=13.

Power Conservation Embodiments

The previous embodiments of the invention that have been described achieve at least substantially constant processing request throughput within an environment that may have varying resource availability. In another embodiment, at least substantially constant processing requesting throughput is achieved within such an environment, while also taking into account power conservation requirements. In such an embodiment, the willingness parameter set in part 202 of the method 200 for each resource also indicates whether the resource is willing to participate in power conservation, or whether the given resource is unwilling to participate in power conservation.

Therefore, the willingness capacity for each resource is determined in part 214 of the method 200 to also take into account whether or not the resource in question is willing to participate in power conservation. For example, where the willingness parameter indicates that a given resource is unwilling to participate in power conservation and where the willingness parameter of the given resource indicates that the given resource is willing to receive no greater than a maximum request limit of processing requests, the willingness capacity of the resource is set to its maximum request limit. Where either of these conditions is not true, then the willingness capacity of the resource is set to its minimum request limit. For instance, where the willingness parameter indicates that the resource is willing to participate in power conservation, or where the willingness parameter indicates that the resource is unwilling to receiver greater than a maximum request limit of processing requests, then the willingness capacity is set to the minimum request limit.

In one particular embodiment, then, the willingness parameter for a given resource can be said to include two sub-parameters. A first sub-parameter indicates whether the given resource is willing to receive a number of processing requests no greater than its maximum request limit, in which case this sub-parameter is equal to one, or whether the resource is willing to receive a number of processing requests no greater than its minimum request limit, in which case this sub-parameter is equal to zero. A second sub-parameter indicates whether the given resource is willing to participate in power conservation, in which case this sub-parameter is equal to one, or is unwilling to participate in power conservation, in which case this sub-parameter is equal to zero. In one embodiment, the second sub-parameter may be able to take on a value between zero and one as well.

In the embodiment described in the preceding paragraph, the willingness parameter may then be set equal to the first sub-parameter, multiplied by one minus the second sub-parameter. That is, WP=FSP(1−SSP). WP is the willingness parameter, FSP is the first sub-parameter, and SSP is the second sub-parameter. In such an embodiment, the willingness capacity for each resource is determined in part 214 of the method 200 as equal to the minimum request limit of the resource, plus the willingness parameter of the resource times the difference between the maximum request limit and the minimum request limit of the resource. That is, WC=MIN+ WP(MAX−MIN), where WC is the willingness capacity, MIN is the minimum request limit, MAX is the maximum request limit, and WP is the willingness parameter set to FSP(1−SSP) as above.

The effect of having the willingness parameter also indicate whether a resource is willing to participate in power conservation is that the resources that are unwilling to participate in power conservation are favored when determining which resources should have their processing request loads increased past their minimum request limits and towards or equal to their maximum request limits. By comparison, resources that are willing to participate in power conservation are desirably to at least some degree held to loads no greater than their minimum request limits. This ensures that resources that are willing to participate in power conservation desirably have their power usage limited by having these resources process less processing requests (i.e., no greater than their minimum request limits), even if these resources are nevertheless willing to process more processing requests (i.e., no greater than their maximum request limits).

Furthermore, a resource willing to participate in power conservation may be requested to change its second sub-parameter to zero from one if part 212 of the method 200 is finished due to all the resources being fully loaded or unavailable, as opposed to part 212 finishing due to the load for each resource being less than or equal to its willingness capacity. That is, part 212 of the method 200 may end due to the potential throughput loss being greater than zero. If this occurs where there is at least one resource that is willing to process no more than its maximum request limit but that is also willing to participate in power conservation, then such resources may be requested to no longer participate in power conservation so that the potential throughput loss can be at least partially distributed to them, by increasing their willingness capacities to their maximum resource limits.

For example, a resource having a first sub-parameter of one and a second sub-parameter of one has a willingness capacity equal to its minimum resource limit, because the second sub-parameter effectively cancels out the first sub-parameter. By changing the second sub-parameter of this resource to zero, the resource will now have a willingness capacity equal to its maximum resource limit. As such, if there is a non-zero potential throughput loss when part 212 of the method 200 finishes, then one way to possibly decrease this potential throughput loss to zero is to request that such resources having both first and second sub-parameters equal to one change their second sub-parameter to zero, indicating that they no longer are to participate in power conservation. Therefore, the method 200 can be repeated again at part 212, since the resources that have had their second sub-parameters changed to zero now have willingness capacities equal to their maximum resource limits instead of their minimum resource limits.

ADDITIONAL EMBODIMENTS AND CONCLUSION

The willingness parameter has been described above as having a value of zero or a value of one. If the willingness parameter has a value of zero, then the willingness capacity for a given resource is determined in part 214 of the method 200 as equal to this resource's minimum request limit. If the willingness parameter has a value of one, then the willingness capacity for the given resource is determined in part 214 as equal to this resource's maximum request limit.

However, the willingness parameter in another embodiment can be any value from zero through one. In such an embodiment, the willingness capacity for a given resource is determined in part 214 of the method 200 as (MAX times WP) plus (MIN times (one minus WP)). MAX is the resource's maximum request limit, MIN is the resource's minimum request limit, and WP is the resource's willingness parameter. This relationship can also be expressed as MIN plus (WP times (MAX minus MIN)).

Furthermore, the willingness parameter has been implicitly described above as being a non-changing, and thus static or indefinite, value. However, in other embodiments, the willingness parameter may vary with time, or may otherwise vary in accordance with a variance attribute. Most generally, the variance attribute dictates how the willingness parameter varies. For example, the variance attribute may specify that the willingness parameter is equal to one at certain times, and at other times is equal to zero.

As another example, the variance attribute may specify that the willingness parameter is equal to one for a specified duration of time, and then reverts to zero. The latter example may be useful in situations in which a resource is requested to increase its willingness parameter. The resource in question may decide to increase its willingness parameter for just a temporary period of time, instead of indefinitely, such that after this period of time has elapsed the willingness parameter is lowered.

Therefore, in the context of the method 200, when determining the willingness capacity for a given resource in part 214, such a variance attribute can also be employed or considered. Stated another way, in part 214 of the method 200, the willingness capacity for a given resource may be determined based on both this resource's willingness parameter and this resource's variance attribute. For instance, the willingness capacity for the given resource may be determined by initially deciding whether to update this resource's willingness parameter. As one example, the variance attribute may be checked to see if the length of time for which the resource's willingness parameter is to have increased has expired, in which case the resource's willingness parameter is lowered before the resource's willingness capacity is determined on the basis of this parameter.

It is noted that embodiments of the invention can be implemented in relation to a computing device, or other type of apparatus, having one or more processors and a computer-readable medium to store one or more computer programs. The processors execute the computer programs from the computer-readable medium. Execution of the computer programs by the processors results in performance of a method. For instance, the method may be any of the methods that have been described above. The computer-readable medium may be a tangible computer-readable medium, such as volatile semiconductor memory, non-volatile storage devices like hard disk drives, and so on. The computing device or other apparatus may have other hardware in addition to the computer-readable medium and the processors.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof

We claim:

1. A method to achieve at least substantially constant processing request throughput within an environment having varying resource availability, comprising, in response to a change in availability of the resources, where the change specifies which of the resources are available and which of the resources are unavailable, and where each resource has a maximum request limit, a minimum request limit, a willingness parameter, and a factor:

setting a normalized factor for each resource based on the factors of the resources, and determining a load for each resource based on the normalized factors;

repeating determining a willingness capacity for each resource based on the willingness parameter of the resource, the willingness parameter indicating at least whether the resource is willing to receive a number of processing requests no greater than the maximum request limit or no greater than the minimum request limit;

determining a throughput overflow for each resource having a load greater than its willingness capacity, determining a potential throughput loss as equal to a sum of the throughput overflows that have been determined, and resetting the load for each resource having a throughput overflow greater than zero;

setting a new normalized factor for each resource that is available and not fully loaded, and updating the load for each resource that is available and not fully loaded based on the new normalized factors and the potential throughput loss, until the load for each resource is less than or equal to the willingness capacity of the resource or until all the resources are each fully loaded or unavailable.

2. The method of claim 1, wherein:

the maximum request limit of a given resource indicates a number of processing requests that the given resource is to maximally receive; and, the minimum request limit of the given resource indicates a number of processing requests that the given resource prefers to maximally receive.

3. The method of claim 1, wherein the factor of a given resource relatively indicates an extent to which the given resource is willing to receive processing requests to be processed within the environment.

4. The method of claim 1, wherein setting the normalized factor for each resource comprises, where there is at least one resource that is available, setting the normalized factor for a given resource equal to the factor of the given resource divided by a sum of the factors of the resources that are available.

5. The method of claim 4, wherein setting the normalized factor for each resource comprises, where there are no resources that are available, setting the normalized factor for a given resource equal to zero.

6. The method of claim 1, wherein determining the load for each resource comprises determining the load for a given resource as equal to a total number of processing requests to be handled within the environment multiplied by the normalized factor for the given resource.

7. The method of claim 1, wherein determining the willingness capacity for each resource comprises determining the willingness capacity for a given resource as equal to the maximum request limit or the minimum request limit of the given resource in accordance with the willingness parameter of the given resource.

8. The method of claim 7, wherein determining the willingness capacity for each resource comprises:

where the willingness parameter of a given resource indicates that the given resource is willing to receive a number of processing requests no greater than the maximum request limit of the given resource, setting the willingness capacity of the given resource to the maximum request limit of the given resource; and, where the willingness parameter of the given resource indicates that the given resource is willing to receive a number of processing requests no greater than the minimum request limit of the given resource, setting the willingness capacity of the given resource to the minimum request limit of the given resource.

9. The method of claim 1, wherein determining the throughput overflow for each resource having a load greater than its willingness capacity comprises determining the throughput overflow for a given resource having a load greater than its willingness capacity as equal to the load of the given resource minus the willingness capacity of the given resource.

10. The method of claim 1, wherein resetting the load for each resource having a throughput overflow greater than zero comprises setting the load for a given resource having a throughput overflow greater than zero to the willingness capacity of the given resource.

11. The method of claim 1, wherein updating the load for each resource that is available and not fully loaded comprises updating the load for a given resource that is available and not fully loaded by the potential throughput loss times the new normalized factor for the given resource.

12. The method of claim 1, wherein the willingness parameter for a given resource further indicates whether the given resource is willing to participate in power conservation or whether the given resource is unwilling to participate in power conservation.

13. The method of claim 12, wherein determining the willingness capacity for each resource comprises:

where the willingness parameter indicates that the given resource is unwilling to participate in power conservation, and where the willingness parameter of the given resource indicates that the given resource is willing to receive a number of processing requests no greater than the maximum request limit of the given resource, setting the willingness capacity of the given resource to the maximum request limit of the given resource; and, where the willingness parameter indicates that the given resource is willing to participate in power conservation, or where the willingness parameter of the given resource indicates that the given resource is willing to receive a number of processing requests no greater than the minimum request limit of the given resource, setting the willingness capacity of the given resource to the minimum request limit of the given resource.

14. The method of claim 12, wherein the willingness parameter for the given resource comprises:
a first sub-parameter indicating whether the given resource is willing to receive a number of processing requests no greater than the maximum request limit or no greater than the minimum request limit; and,
a second sub-parameter indicating whether the given resource is willing to participate in power conservation or not.

15. The method of claim 14, wherein:
the first sub-parameter is equal to one where the given resource is willing to receive a number of processing requests no greater than the maximum request limit, and the first sub-parameter is equal to zero where the given resource is willing to receive a number of processing requests no greater than the minimum request limit; and,
the second sub-parameter is equal to one to indicate one where the given resource is willing to participate in power conservation, and the second sub-parameter is equal to zero where the given resource is unwilling to participate in power conservation.

16. The method of claim 15, wherein the willingness parameter is equal to the first sub-parameter, multiplied by one minus the second sub-parameter.

17. The method of claim 16, wherein determining the willingness capacity for each resource comprises determining the willingness capacity for the given resource as equal to the minimum request limit of the given resource, plus the willingness parameter for the given resource times the difference between the maximum request limit of the given resource and the minimum request limit of the given resource.

18. The method of claim 1, wherein determining the willingness capacity for each resource comprises determining the willingness capacity for a given resource based on the willingness parameter of the given resource and based on a variance attribute of the given resource, the variance attribute of the given resource dictating how the willingness parameter varies.

19. A computer-readable data storage medium having one or more computer programs stored thereon for execution by one or more processors, wherein execution of the computer programs by the processors results in performance of a method to achieve at least substantially constant processing request throughput within an environment having varying resource availability, the method comprising:
setting, for each resource of a plurality of resources within the environment, a maximum request limit, a minimum request limit, a willingness parameter, and a factor, where:
the maximum request limit of a given resource indicates a number of processing requests that the given resource is to maximally receive;
the minimum request limit of a given resource indicates a number of processing requests that the given resource prefers to maximally receive;
the willingness parameter indicates for a given resource at least whether the given resource is willing to receive a number of processing requests no greater than the maximum request limit or whether the given resource is willing to receive a number of processing requests no greater than the minimum request limit;
the factor for a given resource relatively indicates an extent to which the given resource is willing to receive processing requests to be processed within the environment;
in response to a change in availability of the resources, where the change specifies which of the resources are available to receive processing requests and which of the resources are unavailable to receive processing requests,
setting a normalized factor for each resource, the normalized factor of a given resource being equal to the factor of the given resource divided by a sum of the factors of the resources that are available, where there is at least one resource that is available;
determining a load for each resource, the load for a given resource being equal to a total number of processing requests to be handled within the environment multiplied by the normalized factor for the given resource;
repeating
determining a willingness capacity for each resource, the willingness capacity for a given resource equal to the maximum request limit or the minimum request limit of the given resource in accordance with the willingness parameter of the given resource;
where the load for any resource is greater than its willingness capacity,
determining a throughput overflow for each resource having a load greater than its willingness capacity as equal to the load minus the willingness capacity;
determining a potential throughput loss as equal to a sum of the throughput overflow for each resource having a load greater than its willingness capacity;
resetting the load for each resource having a throughput overflow greater than zero, the load reset to the willingness capacity;
setting a new normalized factor for each resource that is available and not fully loaded; and,
updating the load for each resource that is available and not fully loaded, the load for a given resource that is available and not fully loaded being updated by the potential throughput loss times the new normalized factor for the given resource,
until the load for each resource is less than or equal to the willingness capacity of the resource or until all the resources are each fully loaded or unavailable.

20. A computer-readable data storage medium having one or more computer programs stored thereon for execution by one or more processors, wherein execution of the computer programs by the processors results in performance of a method to achieve at least substantially constant processing request throughput within an environment having varying resource availability, the method comprising:
setting, for each resource of a plurality of resources within the environment, a maximum request limit, a minimum request limit, a willingness parameter, and a factor, where:
the maximum request limit of a given resource indicates a number of processing requests that the given resource is to maximally receive;
the minimum request limit of a given resource indicates a number of processing requests that the given resource prefers to maximally receive;
the willingness parameter indicates for a given resource:
whether the given resource is willing to receive a number of processing requests no greater than the maximum request limit or whether the given resource is willing to receive a number of processing requests no greater than the minimum request limit; and, whether the given resource is willing to participate in power conservation or whether the given resource is unwilling to participate in power conservation;

the factor for a given resource relatively indicates an extent to which the given resource is willing to receive processing requests to be processed within the environment;

in response to a change in availability of the resources, where the change specifies which of the resources are available to receive processing requests and which of the resources are unavailable to receive processing requests, setting a normalized factor for each resource, the normalized factor of a given resource being equal to the factor of the given resource divided by a sum of the factors of the resources that are available, where there is at least one resource that is available;

determining a load for each resource, the load for a given resource being equal to a total number of processing requests to be handled within the environment multiplied by the normalized factor for the given resource;

repeating determining a willingness capacity for each resource, comprising:

where the willingness parameter of a given resource indicates that the given resource is unwilling to participate in power conservation, and where the willingness parameter of the given resource indicates that the given resource is willing to receive a number of processing requests no greater than the maximum request limit of the given resource, setting the willingness capacity of the given resource to the maximum request limit of the given resource; and, where the willingness parameter of a given resource indicates that the given resource is willing to participate in power conservation, or where the willingness parameter of the given resource indicates that the given resource is willing to receive a number of processing requests no greater than the minimum request limit of the given resource, setting the willingness capacity of the given resource to the minimum request limit of the given resource;

where the load for any resource is greater than its willingness capacity, determining a throughput overflow for each resource having a load greater than its willingness capacity as equal to the load minus the willingness capacity;

determining a potential throughput loss as equal to a sum of the throughput overflow for each resource having a load greater than its willingness capacity;

resetting the load for each resource having a throughput overflow greater than zero, the load reset to the willingness capacity;

setting a new normalized factor for each resource that is available and not fully loaded; and, updating the load for each resource that is available and not fully loaded, the load for a given resource that is available and not fully loaded being updated by the potential throughput loss times the new normalized factor for the given resource, until the load for each resource is less than or equal to the willingness capacity of the resource or until all the resources are each fully loaded or unavailable.

* * * * *